United States Patent
Koellsch et al.

(10) Patent No.: US 12,503,399 B2
(45) Date of Patent: Dec. 23, 2025

(54) TWO-COMPONENT COMPOSITION FOR FORMING AN INJECTABLE OR PUMPABLE ORGANO-MINERAL MATERIAL, AND ASSOCIATED SEALING METHODS AND USES

(71) Applicant: WEBER MINING & TUNNELLING, Rouhling (FR)

(72) Inventors: Didier Koellsch, Folschviller (FR); Frank Weber, Bridel (LU)

(73) Assignee: WEBER MINING & TUNNELLING, Rouhling (FR)

( * ) Notice: Subject to any disclaimer, the term of this patent is extended or adjusted under 35 U.S.C. 154(b) by 638 days.

(21) Appl. No.: 17/923,592

(22) PCT Filed: May 4, 2021

(86) PCT No.: PCT/EP2021/061648
§ 371 (c)(1),
(2) Date: Nov. 6, 2022

(87) PCT Pub. No.: WO2021/224218
PCT Pub. Date: Nov. 11, 2021

(65) Prior Publication Data
US 2023/0183136 A1  Jun. 15, 2023

(30) Foreign Application Priority Data
May 7, 2020  (FR) ...................... 20 04522

(51) Int. Cl.
*C04B 28/26* (2006.01)
*C08G 18/10* (2006.01)
(Continued)

(52) U.S. Cl.
CPC .............. *C04B 28/26* (2013.01); *C08G 18/10* (2013.01); *C08G 18/1825* (2013.01);
(Continued)

(58) Field of Classification Search
CPC .. C08G 18/10; C08G 18/3895; C08G 18/302; C08G 18/3206; C04B 28/26; C04B 7/02;
(Continued)

(56) References Cited

U.S. PATENT DOCUMENTS

| | | | |
|---|---|---|---|
| 3,607,794 A * | 9/1971 | Abbotson | C04B 28/26 521/137 |
| 4,273,908 A * | 6/1981 | Blount | C08G 18/62 521/154 |
| 2012/0259066 A1* | 10/2012 | Bleyen | C08K 3/346 524/789 |

FOREIGN PATENT DOCUMENTS

| | | |
|---|---|---|
| EP | 000598 | 12/1979 |
| EP | 0016262 | 10/1980 |

(Continued)

OTHER PUBLICATIONS

International Search Report dated Jul. 27, 2021.
(Continued)

*Primary Examiner* — Peter A Salamon
(74) *Attorney, Agent, or Firm* — IPSILON USA, LLP

(57) ABSTRACT

The present invention relates to a two-component composition consisting of a component A intended to be mixed, in situ, with a component B in order to form an injectable or pumpable organo-mineral compound, in particular for injection-sealing dynamic anchor bolts, comprising at least one alkali metal silicate, at least one polyisocyanate derivative and at least one cement. The component A further contains at least one polyol having a molecular mass of between 50 and 200 g/mol, at least one polymerisation catalyst comprising at least one polar function and at least one gelling agent and the component B further comprises at least one suitable.

15 Claims, 1 Drawing Sheet

(51) Int. Cl.
  *C08G 18/18* (2006.01)
  *C08G 18/76* (2006.01)
  *E21D 20/02* (2006.01)
  *C04B 111/00* (2006.01)
  *C04B 111/28* (2006.01)

(52) U.S. Cl.
  CPC ....... *C08G 18/7664* (2013.01); *E21D 20/021* (2013.01); *E21D 20/025* (2013.01); *C04B 2111/00715* (2013.01); *C04B 2111/00724* (2013.01); *C04B 2111/28* (2013.01); *C04B 2201/10* (2013.01); *C08G 2190/00* (2013.01)

(58) Field of Classification Search
  CPC ....... C04B 7/32; C04B 24/282; C04B 40/065; C04B 2103/30; C04B 2103/44; C04B 2103/65
  See application file for complete search history.

(56) References Cited

FOREIGN PATENT DOCUMENTS

| WO | 9321249 | 10/1993 | |
|---|---|---|---|
| WO | WO-9321249 A1 * | 10/1993 | ........... C08G 18/302 |
| WO | 2016172646 | 10/2016 | |

OTHER PUBLICATIONS

U.S. Appl. No. 60/117,410 (Phanopoulos et al.)—Jan. 27, 1999 (Prioirty Application of CL 200000137 published on Jan. 21, 2000—to Applicant Huntsman.

\* cited by examiner

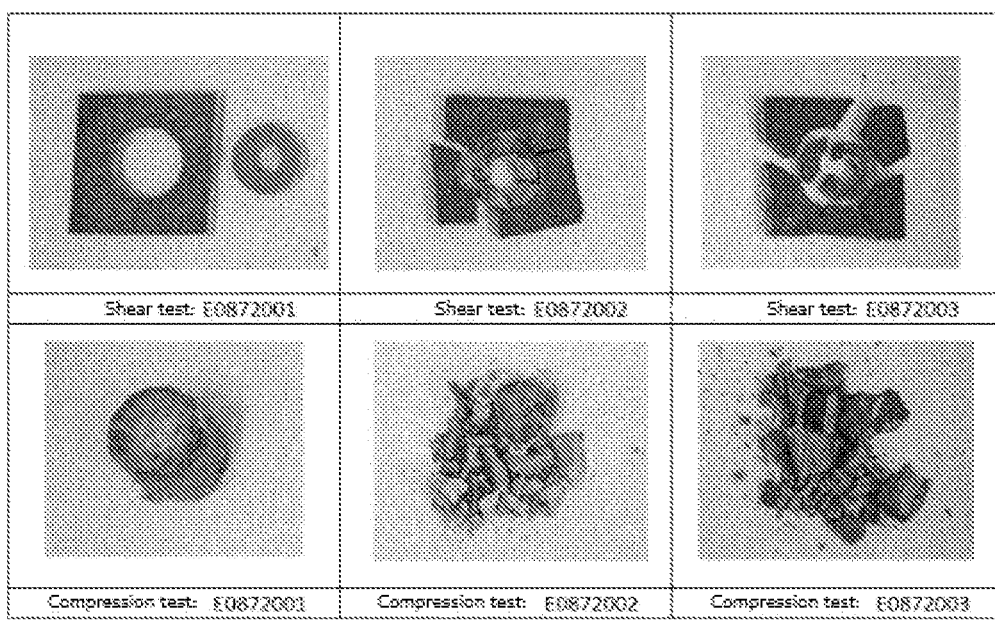

TWO-COMPONENT COMPOSITION FOR FORMING AN INJECTABLE OR PUMPABLE ORGANO-MINERAL MATERIAL, AND ASSOCIATED SEALING METHODS AND USES

RELATED APPLICATION

This application is a National Phase of PCT/EP2021/061648 filed on May 4, 2021, which claims the benefit of priority from French Patent Application No. 20 04522 filed on May 7, 2020, the entirety of which are incorporated by reference.

FIELD OF THE INVENTION

The present invention relates to the field of mining, public works and the like, and more particularly that of injection-sealing anchoring bolts or similar reinforcement structures.

BACKGROUND

In order to seal anchoring bolts for ground reinforcement purposes, notably in underground operations, it is known to make use of two-component compositions pumped in situ by an injection pump which, as they are being mixed, give rise to one or more chemical reactions which harden the mixture and ensure that said anchoring bolt is sealed in the ground. One well-known category of compositions is that which makes use of reactive isocyanate groups in one of their components.

Two-component systems based on isocyanate and alkali metal silicate are well known. Document U.S. Pat. No. 3,607,794 (Conteki) describes, for example, the formation of such systems based on the chemical reaction of isocyanate groups with aqueous solutions of alkali metal silicates. This involves a complex reaction.

Two-component systems based on isocyanate and alkali metal silicate in which the amount of alkali metal silicate, polyol and isocyanate is varied are also well known (cf. for example EP 0 016 262 B2 or EP 0 167 003 A1). Systems based on alkali metal silicate and cement exist. Document EP 0 005 988 A1 describes, for example, such systems. Systems based on alkali metal silicate, cement and isocyanate exist. Document WO 93/21249 describes, for example, such systems. However, these systems do not combine the mechanical properties necessary for certain demanding applications which require high shear modulus and modulus of elasticity, good compressive strength and non-brittle products for polymerization times ranging from 20 seconds to 15 minutes.

Sealing systems based on cartridges containing polyurethane or polyester resins are also well known. Document U.S. Pat. No. 3,882,684 describes, for example, such a system. These sealing systems in the form of cartridges based on unsaturated polyester resins and fillers (sand, calcium carbonate, etc.) are widely used in the mining sector and for tunnels. However, their implementation is complicated, lengthy, tedious and difficult to mechanize and/or automate, this constituting a major drawback.

This is because the emergence of building site or mining equipment that enables the mechanized and/or automated application of bolts (such as for example the Boltec bolting machine developed by Epiroc) has created new requirements for pumpable or injectable solutions of two-component type which nevertheless have ultimate physical or mechanical characteristics (mechanical bending resistance, shear strength, compressive strength, modulus of elasticity, etc.) which are also good or even better than those of the anchors obtained using the polyester-resin cartridge technology.

OBJECTS AND SUMMARY

An improved solution notably based on reactive isocyanate groups and silicate has therefore been pursued.

According to the present invention, what is provided is a two-component composition constituted by a component A intended to be mixed, in situ, with a component B in order to form an injectable or pumpable organo-mineral material or compound, notably for the injection-sealing of dynamic anchoring bolts, the component A comprising essentially at least one alkali metal silicate and the component B comprising essentially at least one polyisocyanate prepolymer and at least one cement, characterized in that the component A moreover contains at least one polyol with a molecular mass of between 50 and 200 g/mol, at least one polymerization catalyst comprising at least one primary amine or alcohol function and at least one gelling agent manifesting the final mixture of the two components A and B in the form of a gel without causing the mixture of said components to set, and in that the component B moreover comprises at least one compatible plasticizer, the final mixture of said components A and B leading to the formation of an organo-mineral material exhibiting compressive strength at 10% strain of at least 17 MPa, in accordance with the standard ISO 604, and a shear strength of at least 7 MPa, in accordance with the standard AFTM D732, for setting times of between 20 seconds and 15 minutes at 20° C.

Advantageously, the alkali metal silicate is a sodium silicate, a potassium silicate or a lithium silicate, or a mixture thereof.

With preference, the alkali metal silicate is a liquid sodium silicate with a molar ratio $SiO_2/Na_2O$ of 1.6 to 3.5, such that $Na_2O \cdot xSiO_2 + H_2O$ (x=1.6-3.5) is obtained, and preferably 1.8 to 2.8.

The aqueous silicates of alkali metals used can be represented by MO·SiO, with M representing an atom of an alkali metal, and they differ in terms of the MO/SiO ratio. Among the aqueous silicates of alkali metals, commercially available sodium silicates have been proven to give satisfactory results. Even though other alkali metal silicates could be used, for example potassium and lithium silicates, they are less preferable for economic reasons.

The use of one or more polyisocyanate prepolymers makes it possible to improve some of the mechanical characteristics, notably performance concerning shear and brittleness.

Moreover, the polyisocyanate prepolymer(s) are advantageously selected from the group formed by: prepolymers based on diphenylmethane diisocyanate (MDI), diphenylmethane-4,4'-diisocyanate and polymeric MDI.

The polyisocyanate used may be an aliphatic, cycloaliphatic, araliphatic, aromatic or heterocyclic diisocyanate, a polymeric polyisocyanate (mixture of isomers), or obtained from a distillation residue having isocyanate groups.

The suitable poly/diisocyanates used in the process of the invention include organic diisocyanates which are compounds of the general formula: $O{=}C{=}NRN{=}C{=}O$, where R is a divalent organic radical, such as an alkylene, aralkylene or arylene radical. Such suitable radicals may contain, for example, 2 to 4 carbon atoms.

Polymeric MDI (also referred to as MDI of polymerization) is understood to mean a mixture of various MDI monomers (usually made up primarily of diphenylmethane-4,4'-diisocyanate and a small amount of diphenylmethane-2,4'-diisocyanate).

According to another feature, the polyisocyanate prepolymer(s) used will have a total proportion of isocyanate (NCO) groups of between 22% and 32%, preferably between 25% and 28%. They may be used on their own or in a mixture with at least one "non-prepolymerized polyisocyanate", that is to say at least one simple polyisocyanate molecule, for example diphenylmethane-4,4'-diisocyanate exhibiting multiple isocyanate groups that have not been reacted beforehand with at least one product able to react with isocyanate groups (glycols, polyols, amines, etc.).

In some embodiments, the poly/diisocyanate prepolymer will be able to be obtained by modifying the type and amount of reactive products (such as glycols, polyols, amines, etc.) used on their own or in a mixture with isocyanate or isocyanates, making it possible to modify certain physicochemical properties thereof (such as, for example, the viscosity, the elasticity, the shear strength, the mechanical compressive strength, the mechanical bending resistance, etc.).

For the sake of practicality in the description, only "the diisocyanates", "MDI" or "MDI prepolymers" will be mentioned below.

Advantageously, the cement or the mixture of cements used is based on: an Artificial Portland Cement (CEM I), Composite Portland Cement (CEM II), Blast-Furnace Cement (CEM III), Pozzolanic Cement (CEM IV), Composite Cement (CEM V), a cement of strength class 32.5 or 42.5 or 52.5, a prompt cement, a prompt natural cement (PNC) NF P 15-314, or a molten high-alumina cement (CA) NF P 15-315, or else microcements.

A prompt natural cement (PNC) NF P 15-314 will also be able to be used, even though the latter might raise some problems of compatibility with the isocyanate, such as for example abnormal thickening, or else contain abrasive granulates that cause wear to the pumping system.

Within the context of some embodiments, microcements having more restricted grain size ranges can be used, on their own or in a mixture or else in combination with other cements. These microcements correspond, for example, to fine-type or ultra-fine-type binders based on blast furnace slag, such as those proposed by the society EQUIOM with the references SPINOR A12, A16, A20, A32 and A48, each having respective grain sizes of between 6 and 48 µm.

In some embodiments, it will be possible to use a cement on its own or a mixture of multiple cements to improve certain properties of the product (mechanical properties, viscosity, thixotropy, setting time, etc.) or for economic reasons.

To improve the shear strength, regulate the viscosity and make the product (final material) less brittle, plasticizers used on their own or in a mixture will be used. Non-aqueous plasticizers that do not contain groups (hydroxyl, primary or secondary amine, acid, etc.) able to react with the isocyanate group, such as for example dioctyl adipate, bis[2-(2-butoxyethoxy)ethyl] adipate, 2-(2-butoxyethoxy)ethyl acetate (BDGA: butyldiglycol acetate), esters of rapeseed oils, etc. will be chosen. The plasticizers used on their own or in a mixture will preferably be selected from among plasticizers bearing linear chains having a molar mass greater than 100 g/mol and a flash point greater than 100° C. The plasticizers, depending on their molecular sizes and their viscosities, will also be able to act as thinner, making it possible to regulate the viscosity of the component B as a function of the viscosity of the MDI prepolymer(s) and the powder content present in said component.

Moreover, in the component A, the use of glycols or polyols with a small molecular size is necessary to thin, adjust the viscosity and improve the miscibility of the additives, such as for example reaction catalysts, gelling or thixotropic reactants, adhesion promoters, etc. To allow good miscibility with the alkali metal silicates, these compounds will have a molecular mass of between 50 and 200 g/mol and preferably between 50 and 100 g/mol, such as for example diethylene glycol, monoethylene glycol, glycerine, etc. For safety reasons, all alcohols having an excessively low flash point (<100° C.) will be avoided. The useful amount of these compounds will depend on the amount of additives to be made miscible and on the desired viscosity.

For reasons of stability and sensitivity of the isocyanate prepolymers, the reaction catalysts will be solely incorporated in the component A. These catalysts will be able to be selected from among the reaction catalysts used in the polyurethane, such as for example: tertiary amines 2-[2-(dimethylamino)ethoxy]ethanol, trialkylamines, for example triethyls, tripropyls, tributyric triarylamines, dialkylalkanolamines and alkyldialkanolamines, such as N,N-dialkylethanolamines, such as triethanolamines, pyrimidine, quinoline, dimethylaniline, N-alkylmorpholines, N,N-dimethylcyclohexylamine, N,N-dimethylbenzylamine and triethylenediamine, etc., metal salts (dibutyltin dilaurate, lead octoate, potassium acetate, etc.).

With preference, for reasons of miscibility with the alkali metal silicates, use will be made of reaction catalysts, such as tertiary amines, in particular tertiary amines comprising at least one polar function such as a primary amine function or alcohol function, such as for example 2-[2-(dimethylamino)ethoxy] ethanol, N,N-dimethylethanolamine or N-methyldiethanolamine.

To promote the formation of a gel referred to as "thixotropic" without causing the final compound to immediately and definitively set, use will be made of a gelling agent, preferably primary or secondary amines, such as for example: diethanolamine, 3-aminomethyl-3,5,5-trimethylcyclohexylamine, guanidine hydrochloride, or certain aminosilanes that form a gel when they react with isocyanates, such as for example trimethoxysilylpropyl diethylenetriamine.

The gel thus formed prevents the mixture of the components A and B from flowing freely out of the injection hole before it sets and allows the cavity to be readily filled, and also, in some cases, to introduce the anchoring bolt or the cable before the mixture sets.

In the same way, a certain percentage of water will be able to be added, so as to regulate the viscosity and to improve the miscibility of the additives, taking care not to adversely affect the mechanical properties necessary for the use.

It is likewise possible to add adhesion agents (or adhesion promoters) to one or the other of the components, such as organofunctional silanes, typically used as adhesion promoters on a wide variety of supports such as concrete, natural stones, metals, plastics, textiles and wood. They are also very effective at improving the compatibility between the mineral fillers and the organic polymers. The adhesion agent will be selected based on its compatibility with said component. For example, for the component A, it will be possible to use DYNASYLAN 1411 (N-(2-aminoethyl)-3-aminopropylmethyldimethoxysilane).

In general, the component B will also be able to contain various additives necessary for introducing powders and keeping them in suspension, such as defoamers, anti-settling agents, rheological agents referred to as thixotropic (such as for example LUVOTHIX, derived from inorganically modified castor oil, sold by Lehvoss, or else hydrophobic fumed silicas, such as for example AEROSIL R202 sold by Evonik) and additives capable of trapping the relative moisture in order to avoid it reacting with the isocyanates, for example molecular sieves such as SYLOSIV, sold by Grace.

The component B will also be able to contain liquid flame retardants such as, for example, tris(1,3-dichloro-2-propyl) phosphate (TCPP) or triethyl phosphate (TEP), which serve to improve the "fire" properties of the compound and may also act as thinner for the mixture.

The component B will also be able to contain solid, powdered flame retardants, such as for example aluminum trihydrates.

Solid fillers may be added to the component B to improve certain mechanical or rheological properties, or for purely economic reasons. The fillers used will preferably be non-abrasive, free of any moisture and non-reactive (such as for example kaolins) with respect to the isocyanates and the cement.

In preferred embodiments, the component A is primarily constituted by:
  50% to 98% by weight, preferably 65% to 95% by weight, of at least one alkali metal silicate that is liquid, that is to say in solution;
  1% to 40% by weight, preferably 5% to 30% by weight, of at least one polyol with a molecular mass between 50 and 200 g/mol;
  0.01% to 5% by weight, preferably 0.025% to 2% by weight, of at least one polymerization catalyst;
  0.01% to 5% by weight, preferably 0.1% to 1% by weight, of at least one gelling agent;
  0% to 10% by weight, preferably 1% to 5% by weight, of water, and
  0% to 5% by weight, preferably 1% to 3% by weight, of at least one adhesion promoter compatible with the alkali metal silicate(s), the glycols and the other additives, the sum of the constituents of the component A being 100%, and wherein the component B is primarily constituted by:
  40% to 80% by weight, preferably 50% to 70% by weight, of at least one isocyanate prepolymer;
  1% to 20% by weight, preferably 5% to 10% by weight, of at least one plasticizer;
  5% to 50% by weight, preferably 15% to 35% by weight, of at least one cement;
  0% to 10% by weight, preferably 1% to 5% by weight, of at least one rheological agent that avoids settling of the powders;
  0% to 10% by weight, preferably 1% to 5% by weight, of at least one moisture-trapping additive;
  0% to 20% by weight, preferably 1% to 5% by weight, of at least one filling agent which does not react with the isocyanate groups;
  0% to 20% by weight, preferably 5% to 10% by weight, of at least one flame retardant for the material formed; and
  0% to 5% by weight, preferably 1% to 3% by weight, of at least one adhesion promoter compatible with the isocyanates, the cement and the other additives, the sum of the constituents of the component B being 100%.

The term "consists essentially of" means that all the additional components are present in an amount that does not significantly affect the shear strength, the compressive strength, the flexural strength and the adhesive properties of the composition.

In the composition according to the invention, the amount by weight of each of the components is a percentage by weight (mass) of the composition.

In a preferred embodiment, the cement is introduced into the MDI prepolymer and constitutes a two-component system, the second component of which is the alkali metal silicate solution.

Advantageously, the volumetric ratio A/B between the component A and the component B is less than 1 and preferably is between ½ and ⅔.

Another subject of the invention is a process for implementing a composition according to the invention, characterized in that the components A and B are injected using positive-displacement pumps or similar equipment that enable the injection to be performed while preserving the volumetric ratio between the various components in the anchoring hole via an injection tube or directly by a self-drilling or non-self-drilling anchoring bolt. The two components are mixed directly during the injection using a static or dynamic mixer.

Advantageously, in the case of the hollow anchoring bolt acting as an injection tube, it has an inlet and an outlet enabling the mixture of the components A and B to migrate into the drilling hole in order to plug the annular space between this anchoring bolt and the ground.

According to another feature, the injection is performed into elements selected from the list formed by: solid-shank anchoring bolts, referred to as "Solid Rebar Bolts", dynamic solid-shank anchoring bolts, dynamic hollow-shank anchoring bolts referred to as "Hollow Core Bolts", and long anchors of the bolt-cable type referred to as "Long Tendons".

The compositions mixed from A and B that are obtained in the present invention confer certain advantages over the existing systems. For example, these compositions improve the compressive strength with respect to the product using solely the known mixture of alkali metal silicate and diisocyanate. The compositions according to the invention limit expansion in the presence of water, making it possible to retain high mechanical properties, by contrast to the polyurethane-based systems which tend to expand and lose their mechanical strength. The compositions of the present invention also have flash points greater than 100° C., by contrast to the sealing products based on unsaturated polyesters containing styrene (flash point of about 35° C.). The present invention moreover makes it possible to rapidly attain the desired mechanical properties while still improving the flexibility properties over systems entirely based on minerals, such as for example products based on silicate and cement, concretes, etc. Moreover, the use of at least one plasticizer in the component B is necessary to ensure that the product is not brittle after polymerization, thus making it possible to ensure high mechanical strengths for polymerization times ranging from a few seconds (20 seconds) to several minutes (15 minutes), even over small thicknesses (a few millimetres). Example 2 shows this in particular.

The compositions of the present invention, because of their fluidity, make it possible to apply them by injection to anchoring bolts, thereby improving the quality and level of filling of the space to be plugged so as to ensure good mechanical strength of the anchoring bolt even over large lengths. This is in comparison with the sealing performed using compositions based on unsaturated polyesters implemented by injection or in the form of cartridges/capsules that can meet with certain performance problems linked with the implementation conditions (high viscosity limiting the pumpability of the mixture, in particular over large sealing lengths; incomplete filling of the space to be plugged, in particular on broken ground), the compositions of the present invention are particularly suitable for applications for sealing solid-shank anchoring bolts referred to as "Solid Rebar Bolts", dynamic solid-shank anchoring bolts, dynamic hollow-shank anchoring bolts referred to as "Hollow Core Bolts", and long anchors of bolt-cable type referred to as "Long Tendons".

According to the present invention, what is therefore proposed is a process for preparing siliceous products, the principle of which comprises the reaction of at least one aqueous solution of an alkali metal silicate with at least one polyisocyanate prepolymer, preferably an organic diisocyanate, in the presence of at least one plasticizer, in combination with the reaction of said at least one aqueous solution of alkali metal silicate with at least one cement. By varying the nature and the relative proportions of the reactants and the reaction conditions, it is possible to obtain solid products exhibiting different physical characteristics.

It should be noted that the reactions in question cause the solution of alkali metal silicate(s) to set. It is probable that a certain number of chemical reactions are involved. Thus, it is known that the organic polyisocyanates and the water react in conjunction with the production of polymers forming urea bonds with production of carbon dioxide. It should also be considered to be probable that all or some of the carbon dioxide thus formed reacts with the alkali metal silicates so as to form a solid silica gel. It is also known that the setting of the cements can be accelerated by adding an alkali metal silicate.

Since the reactions between the alkali metal silicate solution and the poly/diisocyanates are essentially slow reactions, it is advantageous to accelerate them by adding a tertiary amine or any other catalytic system compatible with the alkali metal solution, or via a third component.

It is well known that liquid or powdered silicates can be added to cements to accelerate setting.

In another embodiment, the product may be in the form of multiple components, such as for example three components, etc. The various components may be pumped separately during use, or be subjected to premixing before or during use, such as for example adding cement to the polyisocyanate component in situ. According to one particular example of this embodiment, the product involves a pair of components of type A characterized by different respective reaction times, such that the reaction of a first one of the components is faster than that of the second. As a function of the proportion of each of the two components, the mean reaction time of the mixture of the pair of components of type A is regulated so as to adjust the reaction speed and therefore the duration thereof on the basis, on the one hand, of the desired aim, in particular the elements fixed in place by the composition: cables, bolts, etc., and, on the other hand, of the implementation conditions of the composition and the process of the invention, in particular in connection with the temperature or hygrometry of the surroundings. According to a specific detail of this particular example, one of the two components of type A, in particular the component with the slower reaction time, is associated with a dedicated setting accelerator, the dosage of which makes it possible to bring about an increase in the reaction speed of the component, such that the mean reaction time of the component of type A that is slowest-acting and therefore of the mixture of the pair of components of type A is regulated as a result.

In another embodiment, the cement or the mixture of cement of the component of type B may be introduced in powder form using a mixer tank or any other system making it possible to mix the powder/liquid with the component of type B containing the isocyanate group(s). It should be noted that, when the product involves a plurality of components, the stability of the cement can be obtained by wetting or moistening it beforehand. This operation is carried out with any element or mixture of nonreactive liquid elements which is part of the composition of the component of type B. By way of example, plasticizers or flame retardants can correspond to such elements. This mixture comprising the cement that it stabilizes can also incorporate one or more rheological additives capable of and intended for trapping the moisture of the mixture, and fillers initially present in the component of type B. Such additives then represent 0% to 10% of the weight of the component, preferably 1% to 5% of the weight of the component. This mixture that comprises the cement that it stabilizes and is intended for incorporation in the component of type B can be in the form of a paste or a powder capable of being added to and mixed with other elements that are part of the composition of the component of type B before it is used.

In some embodiments, the filler may be an inert material such that it does not react with the substances of the composition. The type of filler and/or the amount of filler used can be selected depending on the way in which the composition needs to be implemented.

The type of filler and the properties (grain size, impurity, water content, etc.) of the fillers used may easily be determined by a person skilled in the art; for example, the filler may be talc, kaolin, aluminum hydroxide, bentonite, etc.

The fillers may be incorporated in one or the other of the components A or B, maintaining chemical compatibility and stability with the other products constituting said component.

The fillers may be used on their own or in a mixture and with different grain sizes (for example, fine ones combined with less fine ones). The fillers added with the cement or/and the isocyanate must be free of water and moisture to avoid reaction with the latter during storage.

According to another embodiment, fibers are used in addition to or instead of fibers present in certain sealings produced, for example, in the form of bars or strips, so as to improve the mechanical strength of the composition. With preference, and without limiting the invention, the fibers are coupled and added to one or the other of the components or, alternatively, the fibers are coupled and introduced to the rest of the mixture, in the mixer device such as the mixing gun, at the time of the application operation, that is to say after the components have been mixed, for example by the static mixer. It should be noted that the properties afforded by the fibers can vary depending on their respective nature, lengths, diameters, mechanical characteristics, but also proportion in the mixture with the other components and the way in which they are introduced to the other components of the mixture. By way of example, the fibers used may be of glass fiber or polyethylene and/or polypropylene fiber type.

The cements, fillers or fibers used will be able to be selected depending on the injection equipment used. For example, certain cements (such as for example prompt natural cements) or certain fillers (for example fine quartz, such as ASPOLIT) can cause wear to the implementation systems such as, for example, piston pumps or gear pumps.

It should be noted that, because of the restricted range of the grain size of the microcements, they can be used on their own or in a mixture so as to facilitate the selection of the injection equipment used for the implementation.

In some embodiments, when it is adjudged necessary, the components added to the isocyanate will be able to undergo a physical treatment (heat, drying, etc.) or chemical treatment (for example by adding a product such as zeolites, aluminosilicates, etc.) making it possible to extract or trap the water present in order to limit reactions with the isocyanate that could cause the properties to change (increase in viscosity, swelling of the packing, etc.) during the storage period prior to its use. As far as possible, to limit these problems, the raw materials mixed with the isocyanate will be selected with a water content that is as low as possible.

It is well known that the various additives and raw materials of each category could be used on their own or in a mixture with other additives of the same category in order to optimize the overall performance of the finished product, such as for example TCPP with TEP, Luvothix with Aerosil 202, as mentioned above.

The relative proportions of the alkali metal silicate, the isocyanate and the cement may vary, thereby making it possible to obtain, as indicated above, products with different physical characteristics and probably different chemical structures.

In some embodiments, it is possible to vary the reaction speed, in particular the setting time, to obtain slower-acting products, for example with a setting time of several minutes, or faster-acting products, for example with a setting time of several tens of seconds, by involving an accelerator compound in the composition, and in particular by modifying the type or/and the amount of accelerator (or reaction catalyst) present in the component A. The dosage makes it possible to adjust the reaction speed and therefore the reaction duration as a function of the aim and the implementation conditions of the composition and the process of the invention. The addition of a setting accelerator as 3rd component is also possible during the implementation at the time of the injection.

In some embodiments, the volumetric ratio between the component A and the component B may vary. The ratio used will be selected as a function of the ratio between the alkali metal silicates, the MDI prepolymer(s) and the cement and the level of filler in each of the components. The selection of the ratio may also depend on the desired performance (mechanical characteristics), on the type of implementation and the implementation equipment used (injection pumps).

BRIEF DESCRIPTION OF THE DRAWINGS

The invention will be better understood by virtue of the present description, which relates to preferred embodiments which are given by way of nonlimiting examples and explained with reference to the appended schematic drawing, in which:

FIG. 1 shows a photo of tests of compositions according to the present invention.

DETAILED DESCRIPTION

By way of examples and a comparison, mechanical characteristics were measured on different compositions:

Example 1: Composition making it possible to obtain a setting time of 2 to 3 minutes.

TABLE 1

| Ratio component A/component B: 1/2 |
| --- |
| Component A with formulation (in % by weight): |
| 91.5% sodium silicate grade 48/50<br>5.0% glycol (monoethylene glycol)<br>0.2% reaction catalyst (2-(2-dimethylaminoethoxy)ethanol)<br>0.3% gelling agent (diethanolamine DEA)<br>3.0% water |
| Component B with formulation (in % by weight): |
| 47.6% MDI prepolymer with an NCO content of 28% obtained by reacting an MDI prepolymer (Lupranat M20S, registered trade mark) with a diol of mol. mass 2000 g/mol (Lupranol 1000, registered trade mark)<br>10.4% plasticizers (5.2% BDGA and 5.2% methyl ester of rapeseed oil)<br>38.7% cement CEM I 52.5<br>1.7% rheological additive (Luvothix R-RF)<br>1.6% molecular sieve (Sylosiv) |

The compressive strength at 10% strain (tested in accordance with ISO 604) of the resulting non-expanded material was 27.1 MPa after 24 hours at 20° C., the modulus of elasticity in compression was 332 MPa and the shear strength in accordance with ASTM D732 was 15.4 MPa.

Example 2: Composition making it possible to obtain a setting time of about 10 minutes at 20° C.

TABLE 2

| Composition A - formulation (% by weight) | A0832001 | | |
| --- | --- | --- | --- |
| Sodium silicate grade 49-51 | 76.65 | | |
| Water | 3.0 | | |
| Glycerol | 20.0 | | |
| 2-(2-dimethylaminoethoxy)ethanol | 0.05 | | |
| Diethanolamine (DEA) | 0.3 | | |
| Total | 100.0 | | |
| Component B - formulation (% by weight) | B0832001 | B0832002 | B0832003 |
| Polymeric MDI | | 55.0 | 65.0 |
| MDI prepolymer with an NCO content of 28% obtained by reacting a polymeric MDI (Lupranat M20S, registered trade mark) with a diol (Lupranol 1000, registered trade mark) with a mol. mass of 2000 g/mol | 56.6 | | |
| Plasticizer (butyldiglycol acetate BDGA) | 4.2 | 5.0 | |
| Plasticizer (methyl ester of rapeseed oil) | 4.2 | 5.0 | |
| SYLOSIV | 2.0 | 2.0 | 2.0 |
| Rheological agent LEVOTHIX R-RF | 2.0 | 2.0 | 2.0 |
| Filler: Kaolin OPTIWHITE MX | 3.0 | 3.0 | 3.0 |
| Cement: EQIOM CEM I 52.5 N | 28.0 | 28.0 | 28.0 |
| Total | 100.0 | 100.0 | 100.0 |

The mechanical tests were carried out on the material obtained after mixing after 24 hours at 20° C. in accordance with the standard ISO 604 for the compression tests and in accordance with ASTM D732 for the shear tests.

For sealing cables, a long setting time of about 10 minutes is necessary to make it possible to inject, into the drilling hole, a thixotropic product which does not flow out of the hole but which does not harden immediately, making it possible to introduce long cables (for example 8 meters long) before the product sets.

The implementation operations can involve one or two steps. When the implementation comprises only a single step, also referred to as "post grouting", it consists in injecting the composition directly through the anchoring bolt after the bolt has been put in place in the drilled hole via a hollow bar and a self-drilling bolt or, alternatively, via an injection tube installed with the bolt in the case of a cable bolt, a solid bar or a glass-fiber profile. When the implementation is done in two steps, the process, also referred to as "pre-grouting", consists of a first step of injecting the composition into the drilled anchoring orifice and then a second step of inserting the anchoring elements, the bolts, the cable and the fibers. With preference, the injection operation is carried out from the bottom of the drilling hole, at which the orifice of the injection tube is inserted so as to be gradually extracted while the composition is being injected, such that the composition is injected into the drilled anchoring hole in a way which limits the risk of bubble formation.

In table 3, use was made of a component A containing less reaction catalyst with a reaction time of about 10 minutes. The mixture E0872001 uses a combination of the isocyanate prepolymer, the cement and the plasticizer, by contrast with E0872002 which contains an isocyanate, plasticizer and cement, or E0872003 which contains just an isocyanate and cement. Better mechanical properties are clearly observed for the mixture E0872001. Similarly, a much smaller degree of brittleness (cf. photos of FIG. 1) is observed for E0872001 than for E0872002 or E0872003. The mechanical results are indicated in table 3.

TABLE 3

| | Test | | |
|---|---|---|---|
| | E0872001 | E0872002 | E0872003 |
| | | Component A | |
| | A0832001 | A0832001 | A0832001 |
| | | Component B | |
| | B0832001 | B0832002 | B0832003 |
| Ratio component A/component B | 1/2 | 1/2 | 1/2 |
| Compressive strength at 10% strain (MPa) | 18.6 | 13.2 | 2.7 |
| Compressive strength at 20% strain (MPa) | 24.5 | 11.7 | 0.0 |
| Compressive strength at 30% strain (MPa) | 21.9 | 10.1 | 0.0 |
| Shear strength (MPa) | 7.0 | 3.1 | 2.7 |

Table 3 (Mechanical Results for Product with Setting Times of 10 Minutes)

Implementation of the composition according to the invention: In some embodiments, the components will be implemented using positive-displacement pumps such as for example piston pumps, gear pumps, pigtail (Archimedes-screw) pumps, etc, or with any other equipment that enables the injection to be performed while preserving the volumetric ratio between the various components, such as for example follower plates used for viscous or pasty products. The pump(s) used will make it possible to inject the mixture of the various components into the anchoring hole via an injection tube or directly by, that is to say through, the anchoring bolt comprising a hollow nut, such as in the context of implementation of "post grouting" type. The various components are mixed during the injection using a static or dynamic mixer. As an alternative, the various components are mixed after injection, by rotationally introducing the sealing pin, thus ensuring that the components are mixed, such as within the context of implementation of "pre-grouting" type. In each case, mixing the components generates the chemical hardening reaction that makes it possible to seal the anchoring bolt, the sealing pin or the cable in the ground.

The process by injection requires compositions which have viscosities which will be controlled and can be used over a temperature range of 5 to 50° C. and generally of 10 to 35° C. This parameter is important since it determines the quantity of cement, fillers and rheological agent that can be used in the component B and the quantity and the type of MDI prepolymer and plasticizer. This viscosity will be of 50 to 1500 mPa·s and preferably 200 to 1100 mPa·s at 20° C. for the component A and of 50 to 3000 mPa·s and preferably 150 to 1500 mPa·s at 20° C. for the component B. The products may contain rheological additives which act on the viscosity, the values are preferably measured using an MS Z3 DIN system at an angular speed of 700±100 (1/s) corresponding to a rotational speed of 500±100 rpm, making it possible to omit these rheological effects that are especially present at low speed (between 0 and 200 rpm).

The use of an MDI prepolymer improves the mechanical performance, such as shear strength and brittleness, but adversely affects the pumpability because of its higher viscosity than a polymeric MDI. The combined use of an MDI prepolymer and a plasticizer makes it possible to control the viscosity of the component B while still ensuring better mechanical properties.

Of course, the invention is not limited to the embodiments described. Modifications remain possible, in particular from the point of view of the constitution of the various elements or by substitution of technical equivalents, in particular chemical equivalents, without thereby departing from the scope of protection of the invention.

The invention claimed is:

1. A two-component composition comprising:
   a component A mixed, in situ, with a component B in order to form an injectable or pumpable organo-mineral material or compound,
   the component A comprising at least one alkali metal silicate and
   the component B comprising at least one polyisocyanate prepolymer and
   at least one cement,
   wherein component A moreover contains at least one polyol with a molecular mass of between 50 and 200 g/mol, a polymerization catalyst comprising at least one primary amine or alcohol function and at least one gelling agent wherein the final mixture of the two components A and B immediately forms a gel, that is not completely set, and in that the component B moreover comprises at least one compatible plasticizer, the final mixture of said components A and B leading to the formation of an organo-mineral material exhibiting compressive strength at 10% strain of at least 17 MPa, in accordance with the standard ISO 604, and shear strength of at least 7 MPa, in accordance with the standard ASTM D732, and setting times of between 20 seconds and 15 minutes at 20° C.

2. The two-component composition as claimed in claim 1, wherein the alkali metal silicate is a liquid sodium silicate with a molar ratio $SiO_2/Na_2O$ of 1.6 to 3.5, such that $Na_2O \cdot xSiO_2 + H_2O$ (x=1.6-3.5) is obtained, and preferably 1.8 to 2.8.

3. The two-component composition as claimed in claim 1, wherein the polyisocyanate prepolymer(s) have a total proportion of NCO groups of between 22% and 32%, and are selected from the group formed by: prepolymers based on diphenylmethane diisocyanate (MDI), diphenylmethane-4,4'-diisocyanate and polymeric MDI.

4. The two-component composition as claimed in claim 1, wherein the cement or the mixture of cements used is based on: an Artificial Portland Cement (CEM I), Composite Portland Cement (CEM II), Blast-Furnace Cement (CEM III), Pozzolanic Cement (CEM IV), Composite Cement (CEM V), a cement of strength class 32.5 or 42.5 or 52.5, a prompt cement, a prompt natural cement (PNC) NF P 15-314, or a molten high-alumina cement (CA) NF P 15-315, or else microcements.

5. The two-component composition as claimed in claim 1, wherein the plasticizer(s) are non-aqueous plasticizers that do not contain any group which chemically reacts with the isocyanate function.

6. The two-component composition as claimed in claim 1, wherein the component A is constituted by:
50% to 98% by weight, of at least one alkali metal silicate that is liquid;
1% to 40% by weight of at least one polyol with a molecular mass between 50 and 200 g/mol;
0.01% to 5% by weight, of at least one polymerization catalyst;
0.01% to 5% by weight of at least one gelling agent;
0% to 10% by weight of water and
0% to 5% by weight of at least one compatible adhesion promoter;
the sum of the constituents of the component A being 100%;
and in that the component B is constituted by:
40% to 80% by weight of at least one isocyanate prepolymer;
1% to 20% by weight of at least one plasticizer;
5% to 50% by weight of at least one cement;
0% to 10% by weight of at least one rheological agent that avoids settling of the powders;
0% to 20% by weight of at least one filling agent which does not react with the isocyanate groups;
0% to 20% by weight of at least one flame retardant for the material formed; and
0% to 5% by weight of at least one compatible adhesion promoter;
the sum of the constituents of the component B being 100%.

7. The two-component composition as claimed in claim 1, wherein the volumetric ratio A/B between the component A and the component B is less than 1.

8. The two-component composition as claimed in claim 1, wherein the viscosity, measured at 20° C. using an MS Z3 DIN system at a rotational speed of 500+/−100 rpm, is between 50 and 1500 mPa·s, for the component A and between 50 and 3000 mPa·s for the component B.

9. A process for implementing a composition as claimed in of claim 1, wherein the components A and B are injected using positive-displacement pumps or similar equipment that enable the injection to be performed while preserving the volumetric ratio between the various components in an anchoring hole via an injection tube or directly by a self-drilling or non-self-drilling anchoring bolt.

10. The implementing process as claimed in claim 9, wherein, in the case of the hollow anchoring bolt acting as an injection tube, it has an inlet and an outlet enabling the composition as defined in claim 1 to migrate into the drilling hole in order to plug the annular space between this anchoring bolt and the ground.

11. A two component composition as claimed in claim 1, for configured to seal any one of dynamic anchoring bolts, dynamic solid-shank anchoring bolts, dynamic hollow-shank anchoring bolts "Hollow Core Bolts", and long anchors of the bolt-cable type referred to as "Long Tendons".

12. The two-component composition as claimed in claim 3, wherein the polyisocyanate prepolymer(s) have a total proportion of NCO groups of between 25% and 28%.

13. The two-component composition as claimed in claim 6, wherein the component A is constituted by:
65% to 95% by weight of at least one alkali metal silicate that is liquid;
5% to 30% by weight of at least one polyol with a molecular mass between 50 and 200 g/mol;
0.025% to 2% by weight of at least one polymerization catalyst;
0.1% to 1% by weight of at least one gelling agent;
1% to 5% by weight of water and
1% to 3% by weight of at least one compatible adhesion promoter;
the sum of the constituents of the component A being 100%;
and in that the component B is constituted by:
50% to 70% by weight of at least one isocyanate prepolymer;
5% to 10% by weight of at least one plasticizer;
15% to 35% by weight of at least one cement;
1% to 5% by weight of at least one rheological agent that avoids settling of the powders;
1% to 5% by weight of at least one filling agent which does not react with the isocyanate groups;
5% to 10% by weight of at least one flame retardant for the material formed; and
1% to 3% by weight of at least one compatible adhesion promoter;
the sum of the constituents of the component B being 100%.

14. The two-component composition as claimed in claim 7, wherein the volumetric ratio A/B between the component A and the component B is between ½ and ⅔.

15. The two-component composition as claimed in claim 8, wherein the viscosity, measured at 20° C. using an MS Z3 DIN system at a rotational speed of 500+/−100 rpm, is between 200 and 1100 mPa·s, for the component A and between 150 and 1500 mPa·s for the component B.

* * * * *